United States Patent Office 2,891,837
Patented June 23, 1959

2,891,837

PROCESS FOR FORMING CONTINUOUS SHAPED STRUCTURE BY DIRECT CHEMICAL SPINNING

Tod W. Campbell, Wilmington, Del., assignor to E. I. du Pont de Nemours and Company, Wilmington, Del., a corporation of Delaware No Drawing. Application October 24, 1956
Serial No. 617,928

9 Claims. (Cl. 18—54)

This invention relates to a novel and useful process for the preparation of a shaped structure. The invention is more particularly concerned with a process for the direct formation of a continuous shaped structure by the polymerization of a cyclic ether.

It is an object of the present invention to provide a process for the formation of a shaped structure by a rapid polymerization procedure. A further object is to provide for the formation of a continuous shaped structure by a direct chemical spinning procedure. Other objects will appear hereinafter.

These objects are accomplished by the present invention which provides a novel polymerization process. The polymerization process comprises injecting a liquid stream of a reactant consisting essentially of a 3,3-bis(substituted methyl)oxetane or mixtures thereof, through an orifice into an inert fluid containing phosphorus pentafluoride. By "consisting essentially of" is meant that the monomeric reactant contains from about 90% to 100% of a 3,3-bis(substituted methyl)oxetane, or mixtures of said oxetanes, and from 0 to about 10% of a suitable comonomer as is hereinafter pointed out. The liquid stream of a monomeric oxetane polymerizes immediately upon coming in contact with the phosphorus pentafluoride and a continuous shaped structure such as a filament, ribbon, film, tube, or other extruded shape, is directly formed.

The 3,3-bis(substituted methyl)oxetanes useful in the practice of this invention are those which contain the basic ring structure

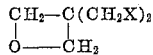

in which X represents a substituent group. In the preferred embodiment of this invention X represents any halogen but more preferably chlorine. These oxetanes all polymerize within a matter of seconds according to the following equation:

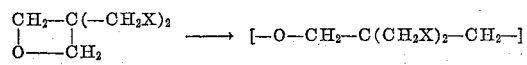

to form the useful high melting shaped structures of the present invention.

The comonomers which may be used in amounts of up to 10% are the cyclic ethers and cyclic thioethers which contain from 3 to 4 members in the ring such as ethylene oxide, ethylene sulfide, epichlorohydrin, 1,2-propylene oxide, trimethylene sulfide, trimethylene oxide, 3,3-bis-(halomethyl)oxetanes, etc., and the various ethylenically unsaturated compounds such as isobutylene, alpha-methyl styrene, the vinyl ethers, etc. In addition various comonomers such as 2,6-dioxaspiro(3,3)heptane, 2-oxa-6-thiaspiro(3,3)heptane, and 2,6-dithiaspiro(3,3)heptane may be used to produce cross-linked products.

The inert fluids which may be used as carriers for the phosphorus pentafluoride catalyst are any of those which are inert to the components of the system (i.e., the monomer, polymer, catalyst, etc.). This includes both liquids and gases as well as mixtures of both such as aerosol dispersions. Among the suitable carriers are the gases such as dry air, nitrogen, argon, the normally gaseous fluorocarbons, methane, etc., and liquids such as perfluorotributylamine, perfluorocyclohexane, and other inert liquids which are immiscible with the monomer.

The concentration of the catalyst in the inert fluid can be from less than 1% up to about 50% by weight with a concentration of 5 to 10% being preferred.

The temperature of the liquid reactant is not at all critical and any temperature may be used which liquefies this reactant. For practical purposes temperatures of from about 0° C. to 100° C. are used for the process. In the preferred embodiment of the invention wherein a 3,3-bis(halomethyl)oxetane is polymerized, the monomers are all liquid at room temperature and this is generally employed. When using other monomers, however, higher or lower temperatures may be used with satisfactory results.

The temperature of the inert fluid containing the phosphorus pentafluoride into which the spinning solution is injected should be within the range of about −25° C. to about +50° C. The lower portion of this range (i.e., −25° C. to +25° C.) is preferred, however, for the production of materials of higher molecular weight. At room temperature, a very satisfactory shaped structure is formed and because of its convenience is generally used for the process.

The invention will now be further described in the following specific examples, which are to be regarded solely as illustrative, and not as restricting the scope of the invention.

*Example I*

A two-liter Erlenmeyer flask is flushed with nitrogen and capped with a polyethylene sheet. About 8 mole percent of phosphorus pentafluoride gas, prepared according to the copending application, Muetterties, S.N. 334,-967, filed February 3, 1953, now abandoned, is introduced into the flask and then a stream of 3,3-bis(chloromethyl)oxetane is injected at room temperature from a No. 20 hypodermic needle (internal diameter 0.023 inch) into the flask. Filaments are immediately formed which after removal from the flask are drawn at 100° C. to oriented crystalline fibers as shown by examination under a polarizing microscope and by X-rays. The crystalline melting point of the filament is 177° C. Filaments so produced and drawn 4 times their extruded length have a tenacity of 1.3 grams per denier, an elongation of 14% at the breaking point, and an initial modulus of 22.

A film is formed using the same conditions as above only employing a slot-shaped orifice rather than a hypodermic needle.

*Example II*

The embodiment as shown in Example I is modified by using a mechanical drive on the plunger of a stainless steel No. 20 hypodermic syringe and needle (internal diameter 0.023 inch) in a dry box which contains an assembly for winding up the filaments as produced. Using this assembly to inject 3,3-bis(chloromethyl)oxetane into about 8 mole percent of phosphorus pentafluoride in nitrogen, filaments are spun at room temperature as in Example I and are wound up continuously at a rate of about 10 feet per minute.

Example III

A solution of 0.1 gram of 2,6-dioxaspiro(3,3)heptane prepared from pentaerythritol dichloride according to the method of Backer and Keuning in Rec. Trav. Chim., volume 53, page 798 (1934), in 5 grams of 3,3-bis(chloromethyl)oxetane is spun from a No. 20 hypodermic needle (internal diameter 0.023 inch) into an atmosphere of phosphorus pentafluoride gas as described in Example II. The resulting filaments are cross-linked, infusible and insoluble in tris-dimethylaminophosphine oxide.

Example IV 11.5 grams of metallic sodium is added under nitrogen to 500 ml. of absolute ethanol. Hydrogen sulfide is passed into the mixture until saturation, then another 11.5 grams of sodium is added. To this solution is added 77.5 grams of 3,3-bis(chloromethyl)oxetane. The mixture is refluxed for 24 hours and then filtered. The precipitate is washed with ether and the combined washing and filtrate are distilled, giving 10.3 grams (20% yield) of the novel intermediate 2-oxa-6-thiaspiro(3,3)heptane of the formula

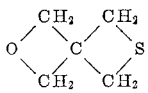

The boiling point of this intermediate is 85° C./15 mm. Seven and one-half grams of the product is oxidized with a solution of 12.5 grams of 30% hydrogen peroxide in 12 ml. of glacial acetic acid for two hours at 25° C. An exothermic reaction occurs, which is controlled in the early stages with ice water. The residue is evaporated to dryness and recrystallized twice from methanol, then once from toluene. The melting point of the novel 2-oxa-6-thiaspiro(3,3)heptane-6,6-dioxide comonomer of the formula

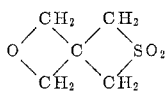

is 161–2° C., yield of 4.7 grams (49%). Analyses calculated for $C_5H_8O_3S$: C, 40.54; H, 5.44. Found: C, 40.32, 40.62; H, 5.37, 5.46.

A 5% solution of the 2-oxa-6-thiaspiro(3,3)heptane-6,6-dioxide prepared above in 3,3-dis(chloromethyl)oxetane is spun into phosphorus pentafluoride vapor, as described in Example I, to form to drawable filament.

Example V

A series of copolymers of 3,3-bis(chloromethyl)oxetane and 3,3-bis(iodomethyl)oxetane prepared according to Beyaert and Govaert, Chemical Abstracts, volume 34, page 5414 (1940), are prepared by injecting various mixtures of the monomers into an atmosphere of phosphorus pentafluoride at room temperature as described in Example I above. The analyses of the resulting filaments are shown below.

| Molar ratio $Cl_2$ monomer / $I_2$ monomer | M.P., °C. | Observed Analyses | | Analysis Cal'd on basis of monomer ratio | |
|---|---|---|---|---|---|
| | | C | H | C | H |
| 3.05 / 1.00 | 163 | 29.94 / 30.39 | 4.12 / 4.05 | 30.0 | 4.0 |
| 1.02 / 2.00 | 240 | 21.81 / 21.90 | 2.92 / 2.90 | 21.7 | 2.9 |
| 2.00 / 1.00 | 185 | 28.11 / 28.18 | 3.88 / 3.98 | 27.8 | 3.7 |
| 1.08 / 1.00 | 210 | 24.88 / 25.00 | 3.57 / 3.66 | 24.8 | 3.3 |

Example VI

A stream of 3,3-bis(chloromethyl)oxetane is injected at room temperature from a No. 20 hypodermic needle (internal diameter 0.023 inch) into perfluorotributylamine containing about 1% phosporus pentafluoride. The filament being lighter than the perfluoro compound floats on the surface and is drawn off. It is dried and drawn 300% at 110° C.

In this invention the polymerization system used is such that the monomer is converted essentially quantitatively to a high molecular weight polymer in a space of a few seconds or at most a few minutes. This is conveniently done by extruding the liquid stream of the monomer into a chamber containing the phosphorus pentafluoride. The filament forms immediately and collects in the bottom of the chamber. With slower reacting systems it is sometimes advantageous to support the thread line on a continuous belt immersed in the gaseous or liquid catalyst mixture to effect a somewhat longer contact time.

The polymerizable reactant used in this invention is a liquid at the temperature employed in the polymerization. The preferred monomers are all liquids between the temperature range of 20° C. and 50° C. and form liquid solutions with the other oxide and sulfide derivatives used as comonomers. When the preferred monomers are used, therefore, the filament is formed by merely extruding the monomer, or the comonomer dissolved in the monomer, into the catalyst chamber. When the monomer itself is solid at room temperature either elevated temperatures may be used to liquefy the reactant or preferably an inert solvent such as cyclohexane, methylene chloride, carbon tetrachloride, etc., may be used to form a spinnable solution. This solution is then extruded through the orifice in the same manner as the preferred monomers.

Various non-reactive products such as polystyrene, polyisobutylene, polytetramethylene oxide, and the like can be added to the liquid polymerizable reactant in amounts of about 5 to about 20% of the monomer to increase the viscosity and to thus afford better spinning. In addition the properties and color of the resulting product can be altered by merely mixing with the polymerizable reactant from about ½ to about 20% of the monomer weight of the various substances such as pigments, plasticizers and dyes that are inert to the monomer(s) and catalyst.

This invention is of value in that it provides a means of economically producing a continuous polyether shaped structure without the numerous steps required in the dry-, wet- and melt-spinning processes formerly used. The products of this invention have good tensile properties and high softening temperatures so that the articles made therefrom have suitable heat resistance or ironability. They are also insoluble in most organic solvents at room temperature so that articles made therefrom have the advantage of good solvent resistance, as, for example, in dry cleaning.

Many modifications will be apparent to those skilled in the art from the reading of the above without a departure from the inventive concept.

What is claimed is:
1. A process for the preparation of a shaped structure which comprises injecting a liquid stream of a 3,3-bis-(halomethyl)oxetane into phosphorus pentafluoride.
2. A process for the preparation of a shaped structure which comprises injecting a liquid stream of a reactant comprising a 3,3-bis(halomethyl)oxetane into an inert fluid containing phosphorus pentafluoride.
3. A process for the preparation of a shaped structure which comprises injecting a liquid stream of a reactant consisting essentially of a 3,3-bis(halomethyl)oxetane into an inert fluid containing phosphorus pentafluoride.
4. The process of claim 3 wherein the fluid is a gas.
5. The process of claim 3 wherein the fluid is a liquid.
6. A process for the preparation of a shaped structure which comprises injecting a liquid stream of a reactant consisting essentially of a monomer selected from the group consisting of a 3,3-bis(halomethyl)oxetane and mixtures thereof, into an inert fluid containing phosphorus pentafluoride.

7. The process of claim 6 wherein the fluid is a gas.
8. The process of claim 6 wherein the fluid is a liquid.
9. The process of claim 6 wherein the monomer is 3,3-bis(chloromethyl)oxetane.

References Cited in the file of this patent

UNITED STATES PATENTS

| | | |
|---|---|---|
| 2,326,326 | Breedis | Aug. 10, 1943 |
| 2,708,617 | Magat | May 17, 1955 |
| 2,722,340 | Feild | Nov. 1, 1955 |
| 2,729,649 | Bottcher et al. | Jan. 3, 1956 |
| 2,737,436 | Boeuf | Mar. 6, 1956 |
| 2,767,195 | Brockman et al. | Oct. 16, 1956 |
| 2,775,507 | Downing | Dec. 25, 1956 |